US012810842B2

(12) United States Patent
Gao et al.

(10) Patent No.: US 12,810,842 B2
(45) Date of Patent: Nov. 24, 2026

(54) METHOD AND DEVICE FOR TRAINING SPEECH TRANSLATION MODEL, AND STORAGE MEDIUM

(71) Applicant: BEIJING BAIDU NETCOM SCIENCE TECHNOLOGY CO., LTD., Beijing (CN)

(72) Inventors: Pengzhi Gao, Beijing (CN); Ruiqing Zhang, Beijing (CN); Zhongjun He, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 136 days.

(21) Appl. No.: 18/930,081

(22) Filed: Oct. 29, 2024

(65) Prior Publication Data

US 2025/0054494 A1 Feb. 13, 2025

(30) Foreign Application Priority Data

Nov. 30, 2023 (CN) ......................... 202311622229.4

(51) Int. Cl.
*G10L 15/06* (2013.01)
*G06F 40/40* (2020.01)
(Continued)

(52) U.S. Cl.
CPC ............ *G10L 15/063* (2013.01); *G06F 40/40* (2020.01); *G06F 40/58* (2020.01); *G06N 3/0455* (2023.01); *G10L 15/02* (2013.01)

(58) Field of Classification Search
CPC ....... G10L 15/063; G10L 15/02; G10L 15/22; G06F 40/40; G06F 40/58
See application file for complete search history.

(56) References Cited

U.S. PATENT DOCUMENTS

2010/0299147 A1* 11/2010 Stallard .................... G10L 15/26 704/277
2011/0238407 A1* 9/2011 Kent ........................ G10L 15/26 704/3

(Continued)

FOREIGN PATENT DOCUMENTS

CN 111008533 A 4/2020
CN 112686058 A 4/2021

(Continued)

OTHER PUBLICATIONS

"Research on end-to-end Mongolian-Chinese phonetic" with English translation (12 pages).

(Continued)

*Primary Examiner* — Shaun Roberts
(74) *Attorney, Agent, or Firm* — Osha Bergman Watanabe & Burton LLP

(57) ABSTRACT

A method for training a speech translation model includes: obtaining a trained first text translation model and a speech recognition model, and constructing a candidate speech translation model to be trained based on the first text translation model and the speech recognition model; obtaining at least one of a first sample source language speech or a first sample source language text to obtain a training sample of the candidate speech translation model; and training the candidate speech translation model based on the training sample until the training is completed, and obtaining a trained target speech translation model.

18 Claims, 4 Drawing Sheets

(51) Int. Cl.

| | |
|---|---|
| ***G06F 40/58*** | (2020.01) |
| ***G06N 3/0455*** | (2023.01) |
| ***G10L 15/02*** | (2006.01) |

(56) References Cited

U.S. PATENT DOCUMENTS

| | | | | |
|---|---|---|---|---|
| 2017/0185583 | A1* | 6/2017 | Pino | G06F 40/289 |
| 2020/0226327 | A1* | 7/2020 | Matusov | G06F 18/214 |
| 2021/0065690 | A1* | 3/2021 | Indurthi | G10L 15/183 |
| 2021/0271826 | A1* | 9/2021 | Wang | G10L 15/005 |
| 2022/0115028 | A1* | 4/2022 | Dhawan | G10L 15/00 |
| 2023/0169281 | A1* | 6/2023 | Zheng | G10L 15/28 704/2 |
| 2023/0298566 | A1* | 9/2023 | Li | G10L 15/16 704/232 |
| 2023/0316004 | A1* | 10/2023 | Wong | G06F 40/51 704/2 |
| 2024/0078391 | A1* | 3/2024 | Kim | G06F 40/40 |

FOREIGN PATENT DOCUMENTS

| | | | |
|---|---|---|---|
| CN | 112926342 | A | 6/2021 |
| CN | 113505610 | A | 10/2021 |
| CN | 113569562 | A | 10/2021 |
| CN | 116469378 | A | 7/2023 |

OTHER PUBLICATIONS

Office Action issued in corresponding CN Application No. 2023116222294 dated Feb. 26, 2025 (25 pages).

* cited by examiner

METHOD AND DEVICE FOR TRAINING SPEECH TRANSLATION MODEL, AND STORAGE MEDIUM

CROSS-REFERENCE TO RELATED APPLICATIONS

This application claims the benefit of priority to Chinese Patent Application No. 2023116222294, filed on Nov. 30, 2023, the contents of which are incorporated herein by reference in their entireties for all purposes.

TECHNICAL FIELD

The present disclosure relates to the field of data processing, and the field of artificial intelligence such as natural speech processing and deep learning, and more particularly relates to a method and a device for training a speech translation model, and a storage medium.

BACKGROUND

In the practice, an end-to-end speech translation can translate a speech signal of a source language into a target text of a target language. However, due to the scarcity of training data for the translation from the speech signal of the source language to the target text of the target language, it is difficult for a model to learn the translation from the speech signal of the source language to the target text of the target language, and a training effect of the model is inadequate.

In related art, the translation from the speech signal of the source language to the target text of the target language can be indirectly realized through model training of a speech recognition model or training of a machine translation model. However, due to a modal gap between the speech and the text, the accuracy of the translation from the speech signal of the source language to the target text of the target language is inadequate in this case.

SUMMARY

According to a first aspect of the present disclosure, there is provided a method for training a speech translation model. The method includes: obtaining a trained first text translation model and a speech recognition model, and constructing a candidate speech translation model to be trained based on the first text translation model and the speech recognition model; obtaining at least one of a first sample source language speech or a first sample source language text to obtain a training sample of the candidate speech translation model; and training the candidate speech translation model based on the training sample until the training is completed, and obtaining a trained target speech translation model.

According to a second aspect of the present disclosure, there is provided an electronic device. The device includes: at least one processor; and a memory communicatively coupled to the at least one processor and storing instructions executable by the at least one processor. The at least one processor is configured to: obtain a trained first text translation model and a speech recognition model, and construct a candidate speech translation model to be trained based on the first text translation model and the speech recognition model; obtain at least one of a first sample source language speech or a first sample source language text to obtain a training sample of the candidate speech translation model; and train the candidate speech translation model based on the training sample until the training is completed and obtain a trained target speech translation model.

According to a third aspect of the present disclosure, there is provided a non-transitory computer-readable storage medium storing computer instructions that, when being executed by a processor of a computer, cause the computer to perform a method for training a speech translation model. The method includes: obtaining a trained first text translation model and a speech recognition model, and constructing a candidate speech translation model to be trained based on the first text translation model and the speech recognition model; obtaining at least one of a first sample source language speech or a first sample source language text to obtain a training sample of the candidate speech translation model; and training the candidate speech translation model based on the training sample until the training is completed, and obtaining a trained target speech translation model.

It is appreciated that the content described in this section is not intended to identify key or important features of embodiments of the present disclosure, nor is it intended to limit the scope of the present disclosure. Other features of the present disclosure will be readily understood by the following description.

BRIEF DESCRIPTION OF THE DRAWINGS

The drawings are used for a better understanding of the present disclosure and do not constitute a limitation of the present disclosure.

DETAILED DESCRIPTION

Figure 1:
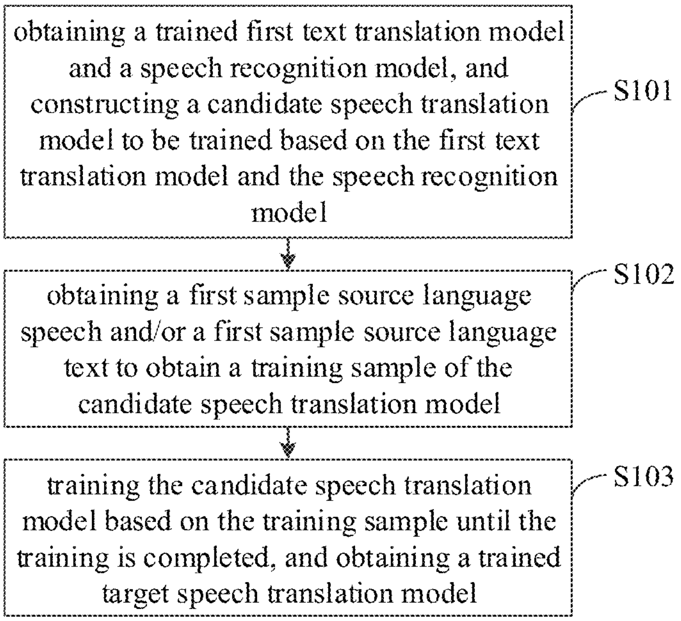
FIG. 1 is a flowchart of a method for training a speech translation model according to an embodiment of the present disclosure.

Embodiments of the present disclosure are described hereinafter in conjunction with the accompanying drawings, which include various details of the embodiments of the present disclosure to facilitate understanding, and which should be considered exemplary only. Accordingly, one of ordinary skill in the art should recognize that various changes and modifications can be made to the embodiments described in the present disclosure without departing from the scope and spirit of the present disclosure. Similarly, descriptions of conventional functions and structures are omitted from the following description for the sake of clarity and brevity.

Data processing is a fundamental aspect of systems engineering and automation. Data is a form of expression of facts, concepts, or instructions that can be processed manually or by automated devices. The data becomes information when it is interpreted and given a certain meaning. The data processing is collection, storage, retrieval, processing, transformation and transmission of the data. A basic purpose of the data processing is to extract and derive from a large amount of data, which may be disorganized and difficult to comprehend, data that is valuable and meaningful to some particular people.

Deep Learning (DL) is a new research direction in the field of machine learning. The deep Learning is a process of learning intrinsic laws and levels of representation of sample data, information gained from these learning processes can be of great help in interpreting data such as text, images and sounds. Its ultimate goal is to enable machines to have analytical learning capabilities like humans and be able to recognize data such as text, images and sounds.

Natural Language Processing (NLP) is an important direction in the field of computer science and artificial intelligence. It studies various theories and methods that enable effective communication between humans and computers in natural languages. The NLP is a science that integrates linguistics, computer science, and mathematics. Therefore, the research in this field will involve natural language, i.e., the language that people use every day, so it is closely related to the study of linguistics, but with important differences, because the NLP is not the study of natural language in general, but lies in the development of computer systems that can effectively realize natural language communication.

Artificial Intelligence (AI) is a new technological science that studies and develops theories, methods, technologies and application systems for simulating, extending and expanding human intelligence. The AI is a branch of computer science that attempts to understand the essence of intelligence and produce a new intelligent machine capable of responding in a manner similar to human intelligence, and research in this field includes robotics, language recognition, image recognition, natural language processing, and expert systems. Since the birth of artificial intelligence, the theory and technology become more and more mature, and the field of application is expanding. It can be envisioned that the technology products brought by artificial intelligence in the future will be the "containers" of human intelligence. The AI can simulate the information process of human consciousness and thinking.

FIG. 1 is a flowchart illustrating a method for training a speech translation model according to an embodiment of the present disclosure, as shown in FIG. 1, the method including the following steps S101 to S103.

At S101, a trained first text translation model and a speech recognition model are obtained, and a candidate speech translation model to be trained is constructed based on the first text translation model and the speech recognition model.

In an embodiment of the present disclosure, the translation of speech of a source language to text of a target language may be realized through the trained speech translation model, in which the speech translation model to be trained may be marked as a candidate speech translation model.

A speech to be translated may be marked as the source language, and the language to which the text to be translated from the speech belongs may be marked as the target language. For example, it is determined that a Chinese speech, as the speech to be translated, needs to be translated into English, and in this example, the Chinese language speech to be translated is the source language, and the translated English language is the target language.

Alternatively, the candidate speech translation model may be constructed based on the trained text translation model and the speech recognition model, in which the text translation model used in constructing the candidate speech translation model may be marked as the trained first text translation model.

In this scenario, a pre-trained speech recognition model may be obtained as the speech recognition model linked to the first text translation model, or a speech recognition model to be trained may be obtained and performed with corresponding model training to obtain the speech recognition model linked to the first text translation model, which is not limited in the present disclosure.

The pre-trained speech recognition model may be a pre-trained model (wav2vec2.0) or other pre-trained speech recognition model, which is not limited in the present disclosure.

At S102, a first sample source language speech and/or a first sample source language text are obtained to obtain a training sample of the candidate speech translation model.

In an embodiment of the present disclosure, the candidate speech translation model requires model training of speech translation, in which the source language text used in the model training process may be marked as the first sample source language text, and the source language speech used in the model training process may be marked as the first sample source language speech.

Figure 2:
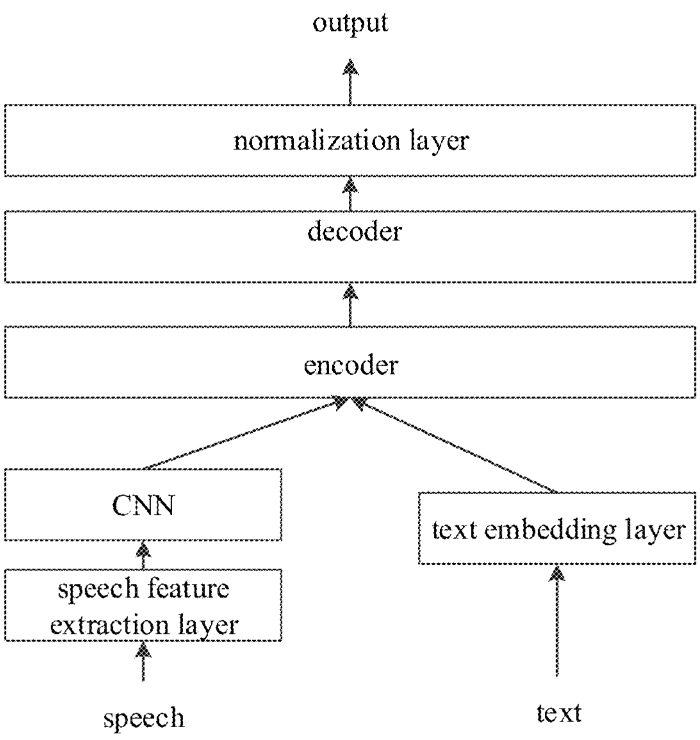
FIG. 2 is a flowchart of a method for training a speech translation model according to an embodiment of the present disclosure.

As an embodiment, as shown in FIG. 2, the source language speech used during the model training of the candidate speech translation model illustrated in FIG. 2 may be marked as the first sample source language speech, and the source language text used during the training of the candidate speech translation model illustrated in FIG. 2 may be marked as the first sample source language text.

Alternatively, a translated target language text corresponding to the first sample source language speech may be obtained, and the translated target language text and the first sample source language speech may be processed based on a method for generating a training sample in the related art, so as to obtain the training sample of the candidate speech translation model.

Alternatively, the translated target language text corresponding to the first sample source language text may also be obtained, and the text and the first sample source language text may be processed based on the method for generating the training sample in the related art, thus obtaining the training sample of the candidate speech translation model.

It is noted that the training sample may be obtained based on the first sample source language speech, or may be obtained from the aligned first sample source language speech and the first sample source language text, which is not limited in the present disclosure.

At S103, the candidate speech translation model is trained based on the training sample until the training is completed, and a trained target speech translation model is obtained.

In an embodiment of the present disclosure, the training sample may be input into the candidate speech translation model to be trained, a speech feature of the training sample may be extracted by the candidate speech translation model, and a translation of the training sample may be performed based on the speech feature, and an output result of the candidate speech translation model may be obtained.

The output result and a label of the training sample may be algorithmically processed based on a loss value acquisition algorithm in the related art, thus obtaining a loss value of the output result based on the label of the training sample, and obtaining a training loss of the candidate speech translation model based on the loss value.

Alternatively, the candidate speech translation model may be adjusted based on the training loss, and it is returned to obtain a next training sample to continue training the adjusted candidate speech translation model until the training is completed, and the model obtained from the training is determined to be the trained target speech translation model.

The method for training the speech translation model provided in the present disclosure, includes: obtaining a trained first text translation model and a speech recognition model, and constructing a candidate speech translation model to be trained based on the first text translation model and the speech recognition model; obtaining a first sample source language speech and/or a first sample source language text to obtain a training sample of the candidate speech translation model; and training the candidate speech translation model based on the training sample until the training is completed, and obtaining a trained target speech translation model. In the present disclosure, the candidate speech translation model to be trained is constructed through the trained text translation model and the speech recognition model, the difficulty of constructing the candidate speech translation model and the complexity of the model are reduced, and the realizability of the speech translation model is improved. Through the sole training of the text translation model and then the training of the speech translation model, the difficulty of training the speech translation model is reduced, and the influence of the number of samples of translation from the source language speech to the target language text on the training effect of the speech translation model is reduced, and the training method and training effect for the speech translation model are optimized, and the practicality and applicability of the speech translation model are improved. Further, in the scenario of speech translation based on the trained target speech translation model, the efficiency and accuracy of speech translation are improved, and the method for speech translation is optimized.

Figure 3:
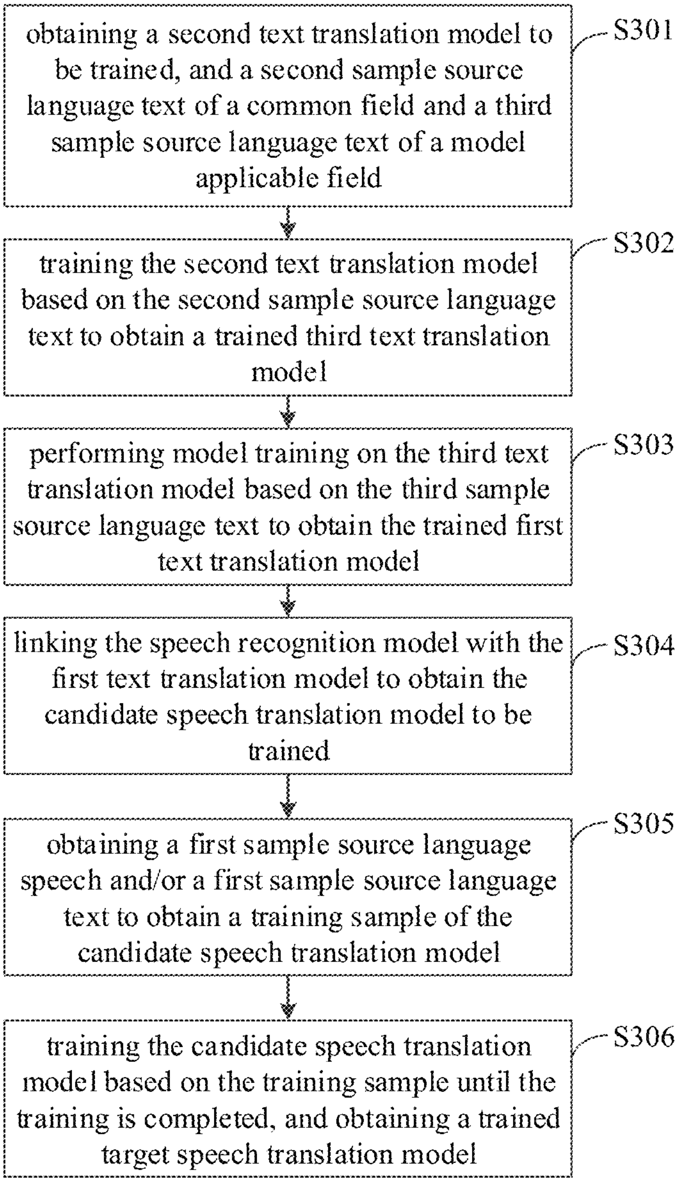
FIG. 3 is a flowchart of a method for training a speech translation model according to an embodiment of the present disclosure.

In the above embodiments, the process of obtaining the trained first text translation model may be further understood in combination with FIG. 3, which is a flowchart illustrating a method for training a speech translation model according to an embodiment of the present disclosure. As shown in FIG. 3, the method includes the following steps S301 to S306.

At S301, a second text translation model to be trained, and a second sample source language text of a common field and a third sample source language text of a model applicable field are obtained.

In an embodiment of the present disclosure, the text translation model to be trained may be marked as the second text translation model to be trained.

Alternatively, the sample used in the second text translation model to be trained may be obtained based on the source language text of the common field and marked as the second sample source language text.

The source language text of the common field may be obtained through an open source dataset in the related art, or the source language text may be obtained through a text statistics method in the related art, which is not limited in the present disclosure.

In an implementation, there may be a technical field to which the trained speech translation model is applicable, and in this scenario, a relevant source language text in the technical field may also be obtained to perform the model training of the text translation model. The applicable technical field of the speech translation model may be marked as a model applicable field, and a training sample obtained based on the source language text of the technical field may be marked as the third sample source language text.

As an example, the model applicable field of the trained speech translation model is set to be the field of biology, and in this example, a relevant academic text in the field of biology may be obtained as the source language text to be translated, and the training sample obtained based on the source language text is labeled as the third sample source language text.

At S302, the second text translation model is trained based on the second sample source language text to obtain a trained third text translation model.

Alternatively, the second sample source language text may be input into the second text translation model to obtain a first translated text output by the second text translation model.

In an embodiment of the present disclosure, the second sample source language text may be input into the second text translation model to be trained, and a text feature of the second sample source language text may be extracted by the second text translation model, and translation may be performed according to the extracted text feature, thus obtaining the translated text outputted by the second text translation model, which is marked as the first translated text.

Figure 4:
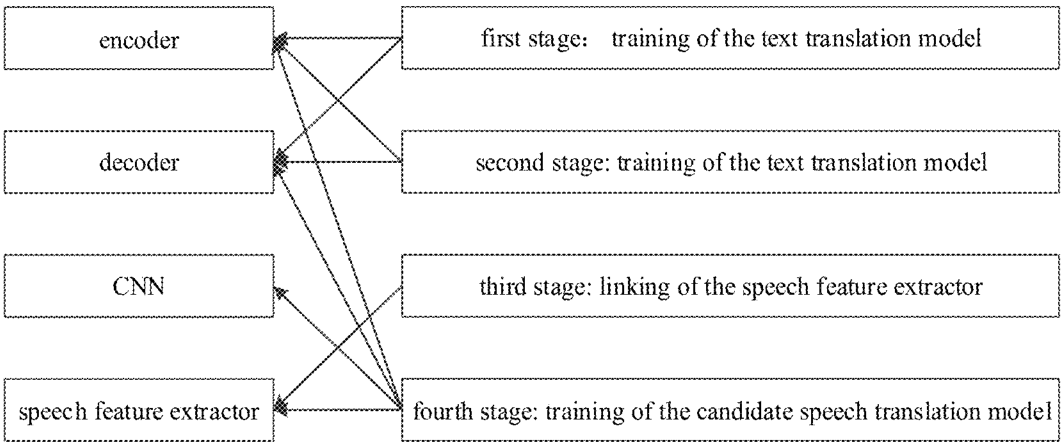
FIG. 4 is a flowchart of a method for training a speech translation model according to an embodiment of the present disclosure.

As an embodiment, as shown in FIG. 4, the training of the second text translation model may be configured as a first stage training of the text translation model illustrated in FIG. 4. A vector representation corresponding to the text feature of the second sample source language text may be obtained through an encoder illustrated in FIG. 4, and thus an output result obtained, by the decoder illustrated in FIG. 4, based on the vector representation output by the encoder may be obtained, and thus the first translated text output by the second text translation model may be obtained based on the output result.

Alternatively, a first label text of the second sample source language text is obtained.

In an embodiment of the present disclosure, there is label information corresponding to the second sample source language text, in which the label information may carry text information of a target language to which the second sample source language text needs to be translated. The text information of the target language may be marked as the first label text of the second sample source language text.

Alternatively, a first training loss of the second text translation model is obtained based on the first translated text and the first label text.

In an embodiment of the present disclosure, the first translated text and the first label text may be algorithmically processed based on a loss value acquisition algorithm in the related art, and thus the first training loss of the second translation model may be obtained based on the result of the algorithmic processing.

As an embodiment, the first translated text and the first label text may be algorithmically processed based on a loss value acquisition algorithm of cross entropy in the related art, and thus the first training loss of the second translation model may be obtained.

The algorithmic formula for the cross entropy loss value may be:

$$L_{ce}^{mt}(\theta) = l(f(x, y; \theta), \ddot{y})$$

$$L_{intra}^{mt}(\theta) = biKL(f_1(x, y; \theta), f_2(x, y; \theta))$$

In the above formula, L denotes the loss function, mt denotes the machine translation, ce denotes the cross entropy, intra denotes the intra-modal, θ denotes the model parameter, x denotes the text of the source language input to the model, y denotes the text of the target language output from the model, ÿ denotes the one-hot label, and biKL denotes the bidirectional KL scatter (Kullback-Leibler Divergence).

In the implementation, the machine translation mt in the above formula can be understood as the second text translation model provided in the above embodiments.

Alternatively, the second text translation model is adjusted based on the first training loss, and it is returned to obtain a next second sample source language text to continue the training of the adjusted second text translation model until the completion of the training, and the trained third text translation model is obtained.

In an embodiment of the present disclosure, the model parameter of the second text translation model may be adjusted based on the first training loss, and it is returned to obtain a next second sample source language text to continue the model training on the parameter-adjusted second text translation model until the training is completed, to obtain the trained third text translation model.

A training completion condition of the second text translation model may be determined based on a number of training rounds, and in case the total number of the training rounds of the model of a current round meets the predetermined training completion condition, the training of the model may be completed, and the model obtained at the completion of the training of the current round may be determined to be the trained third text translation model.

Accordingly, the training completion condition of the second text translation model may also be determined based on an output result of the model, and in a case that the output result of the model of a current round meets the predetermined training completion condition, the training of the model may be completed, and the model obtained at the completion of the training of the current round may be determined to be the trained third text translation model.

At S303, model training on the third text translation model is performed based on the third sample source language text to obtain the trained first text translation model.

Alternatively, the third sample source language text is input into the third text translation model to obtain a second translated text outputted from the third text translation model.

In an embodiment of the present disclosure, the third sample source language text may be input into the third text translation model, and a text feature of the third sample source language text may be extracted by the third text translation model, and then the third sample source language text may be translated based on the extracted text feature, and the second translated text outputted by the third text translation model may be obtained.

As an embodiment, as shown in FIG. 4, the training of the third text translation model may be regarded as a second stage training of the text translation model illustrated in FIG. 4. A vector representation corresponding to the text feature of the third sample source language text may be obtained through the encoder illustrated in FIG. 4, and thus an output result obtained, by the decoder illustrated in FIG. 4, based on the vector representation output by the encoder may be obtained, and thus the second translated text in the target language output by the third text translation model may be obtained based on this output result.

Alternatively, a second label text of the third sample source language text is obtained.

In an embodiment of the present disclosure, there is label information corresponding to the third sample source language text, in which the label information carries a reference text of a target language to which the third sample source language text needs to be translated, the reference text of the target language may be marked as the second label text of the third sample source language text.

Alternatively, a second training loss of the third text translation model is obtained based on the second translated text and the second label text.

In an embodiment of the present disclosure, the second translation text and the second label text may be algorithmically processed based on a loss value acquisition algorithm in the related art, and thus the second training loss of the third text translation model may be obtained based on the result of the algorithmic processing.

It is noted that the second training loss of the third text translation model may be obtained based on a loss value algorithm of cross entropy in the related art, in which the acquisition process of acquiring the second training loss based on the loss value of cross entropy may be understood in combination with the obtaining process of obtaining the first training loss based on the loss value acquisition formula of cross entropy provided in the above embodiments, which is not repeated here.

Alternatively, the third text translation model is adjusted based on the second training loss, it is returned to obtain a next third sample source language text to continue the training of the parameter-adjusted third text translation model until the completion of the training, thus obtaining the trained first text translation model.

In an embodiment of the present disclosure, the model parameter of the third text translation model may be adjusted based on the second training loss, and it is returned to obtain a next third sample source language text to continue the model training of the parameter-adjusted third text translation model until the training is completed, to obtain the trained first text translation model.

A training completion condition of the third text translation model may be determined based on the number of training rounds, and in a case that the total number of training rounds of the model of a current round meets the predetermined training completion condition, the training of the model may be completed, and the model obtained at the completion of the training of the current round may be determined to be the trained first text translation model.

Accordingly, the training completion condition of the third text translation model may also be determined based on an output result of the model, and in a case that the output result of the model of a current round meets the predetermined training completion condition, the training of the model may be completed, and the model obtained at the completion of the training of the current round may be determined to be the trained first text translation model.

At S304, the speech recognition model is linked with the first text translation model to obtain the candidate speech translation model to be trained.

In an embodiment of the present disclosure, the trained speech recognition model may be linked to the first text translation model based on an input direction of the first text translation model, thus obtaining the candidate speech translation model to be trained.

In an implementation, as shown in FIG. 2, the trained speech recognition model, as a speech feature recognition layer illustrated in FIG. 2, may be linked to the first text translation model.

As shown in FIG. 2, a convolutional neural network (CNN) layer may be provided between the speech recognition model and the first text translation model, and the link between the speech recognition model and the first text translation model may be realized through the CNN layer illustrated in FIG. 2, thus obtaining the candidate speech translation model to be trained.

Alternatively, as shown in FIG. 4, the linking of the first text translation model and the speech recognition model may be realized by linking of a speech feature extractor in a third stage illustrated in FIG. 4, in which the speech feature extractor illustrated in FIG. 4 may be used as the speech recognition model, and the construction of the candidate speech translation model to be trained may be realized by linking the speech feature extractor to the trained first text translation model.

At S305, the first sample source language speech and/or the first sample source language text are obtained, to obtain the training sample of the candidate speech translation model.

In an embodiment of the present disclosure, the training sample of the candidate speech translation model may be obtained based on the first sample source language text, and the training sample of the candidate speech translation model may also be obtained based on the aligned first sample source language text and the first sample source language speech.

Alternatively, the first sample target language text of the first sample source language text is obtained and the first sample target language text is used as a label for the first sample source language text, to obtain the training sample of the candidate speech translation model.

In an embodiment of the present disclosure, a text of a target language to which the first sample source language text needs to be translated may be obtained as the first sample target language text, and the first sample target language text may be used as the label for the first sample source language text, to obtain the training sample of the candidate speech translation model.

In this scenario, the model training of the candidate speech translation model in the text translation capability dimension may be performed through the training sample obtained based on the first sample source language text and the first sample target language text.

Alternatively, the second sample target language text of the first sample source language speech is obtained, and the second sample target language text is used as a label for the first sample source language text to obtain the training sample of the candidate speech translation model.

In an embodiment of the present disclosure, a text of a target language to which the first sample source language speech needs to be translated may be obtained as the second sample target language text, and the second sample target language text may be used as a label for the first sample source language speech, thus obtaining the training sample of the candidate speech translation model.

In this scenario, the model training of the candidate speech translation model in the speech translation capability dimension may be performed through the training sample obtained based on the first sample source language speech and the second sample target language text.

Alternatively, the second sample source language text of the first sample source language speech is obtained, and the second sample source language text is used as a label for the first sample source language speech to obtain the training sample of the candidate speech translation model.

In an embodiment of the present disclosure, the source language text corresponding to the first sample source language speech may be obtained as the second sample source language text, and the second sample source language text may be used as a label for the first sample source language speech, thus obtaining the training sample of the candidate speech translation model.

In this scenario, the model training of the candidate speech translation model in the speech feature extraction capability dimension may be performed through the training sample obtained based on the first sample source language speech and the second sample source language text.

It is noted that in the process of the model training of the candidate speech translation model, the training sample in any one of the above three scenarios may be adopted for the model training of the candidate speech translation model respectively, which is not specifically limited in the present disclosure.

At S306, the candidate speech translation model is trained based on the training sample until the training is completed, and a trained target speech translation model is obtained.

Alternatively, the training sample is input into the candidate speech translation model to obtain a third translated text outputted from the candidate speech translation model.

As an embodiment, in a scenario where the training sample is obtained based on the first sample source language speech, as shown in FIG. 2, the training sample may be input into the candidate speech translation model, a speech feature of the training sample is extracted through the speech feature extraction layer illustrated in FIG. 2, the extracted speech feature is convolved through the CNN layer illustrated in FIG. 2, and the output result of the CNN layer is inputted into the encoder illustrated in FIG. 2.

In addition, the corresponding feature vector representation is obtained by the encoder illustrated in FIG. 2, and the output result corresponding to the feature vector representation is obtained by the decoder illustrated in FIG. 2, thus obtaining, based on the output result, the third translated text outputted by the candidate speech translation model based on the training sample.

As an implementation, as shown in FIG. 4, the model training of the candidate speech translation model is realized by the speech feature extractor, the CNN layer, the encoder, and the decoder, which are included in the fourth stage training of the candidate speech translation model illustrated in FIG. 4, in which the speech feature in the training sample can be extracted by the speech feature extractor, the speech feature is convolved by the CNN layer, and the output result obtained by the CNN layer based on the speech feature is input into the encoder illustrated in FIG. 4, and after obtaining the vector representation output by the encoder, the vector representation is correspondingly processed by the decoder illustrated in FIG. 4, thus obtaining the third translated text output by the candidate speech translation model based on the output result of the decoder.

Alternatively, in a scenario where the training sample is obtained based on the first sample source language text, as shown in FIG. 2, the training sample may be input into the candidate speech translation model, the text feature of the training sample is extracted through the text embedding layer illustrated in FIG. 2, the extracted text feature is convolved through the CNN layer illustrated in FIG. 2, and the output of the CNN layer is input into the encoder illustrated in FIG. 2.

In addition, the corresponding feature vector representation is obtained by the encoder illustrated in FIG. 2, and the output result corresponding to the feature vector representation is obtained by the decoder illustrated in FIG. 2, and the output result is outputted by the normalization layer illustrated in FIG. 2, thus obtaining the third translated text outputted by the candidate speech translation model based on the training sample.

Alternatively, a third label text of the training sample is obtained and a third training loss of the third translated text is obtained based on the third label text.

In an embodiment of the present disclosure, a label text of the training sample used for the model training of the candidate speech translation model of a current round may be marked as the third label text.

In this scenario, the third translation text and the third label text may be algorithmically processed based on a loss value acquisition algorithm in the related art, and thus the training loss of the candidate speech translation model may be obtained based on the results of the algorithmic processing as the third training loss.

As an example, the third training loss of the candidate speech translation model may be obtained based on the loss value acquisition algorithm of cross entry entropy. The acquisition formula of the loss value of cross entropy may be:

$$L_{ce}^{st}(\theta) = l(f(s, y; \theta), \ddot{y})$$

$$L_{intra}^{st}(\theta) = biKL(f_1(s, y; \theta), f_2(s, y; \theta))$$

In the above formula, L denotes the loss function, mt denotes the machine translation, ce denotes the cross entropy, intra denotes the intra-modal, θ denotes the model parameter, x denotes the text of the source language input to the model, y denotes the text of the target language output from the model, s denotes the source language speech of the input model, ÿ denotes the one-hot label, and biKL denotes the bidirectional KL scatter (Kullback-Leibler Divergence).

Alternatively, the candidate speech translation model is adjusted based on the third training loss, it is returned to obtain a next training sample to continue the training of the parameter-adjusted candidate speech translation model until the completion of the training, and the trained target speech translation model is obtained.

In an embodiment of the present disclosure, the model parameter of the candidate speech translation model may be adjusted based on the third training loss, and it is returned to obtain the next training sample to continue model training of the parameter-adjusted candidate speech translation model until the training is completed, to obtain the trained target speech translation model.

A training completion condition of the candidate speech translation model may be determined based on the number of training rounds, and in a case that the total number of the training rounds of the model of a current round meets the predetermined training completion condition, the training of the model may be completed, and the model obtained at the completion of the training of the current round may be determined to be the trained target speech translation model.

Alternatively, the training completion condition of the candidate speech translation model may also be determined based on the output result of the model, and in a case that the output result of the model of a current round meets the predetermined training completion condition, the training of the model may be completed, and the model obtained at the completion of the training of the current round may be determined to be the trained target speech translation model.

The method for training the speech translation model provided in the present disclosure, including: obtaining a second text translation model to be trained, and a second sample source language text of a common field and a third sample source language text of a model applicable field; training the second text translation model based on the second sample source language text to obtain a trained third text translation model; obtaining the trained first text translation model by performing second training on the third text translation model through the third sample source language text, and then constructing a candidate speech translation model to be trained based on the first text translation model and the trained speech recognition model; and further, obtaining the training sample of the candidate speech translation model based on the first sample source language speech and/or the first sample source language text, and obtaining the trained target speech translation model by performing the model training of the candidate speech translation model based on the training sample. In the present disclosure, through training the text translation model with the sample text of the common field and the sample text of the model applicable field, the text translation capability and the text translation accuracy rate of the first text translation model in the model applicable field are improved, and thus the speech translation capability and the speech translation accuracy rate of the speech translation model constructed based on the first text translation model in the model applicable field are improved. Through obtaining the training samples of the candidate speech recognition model based on the first sample source language speech and/or the first sample source language text, the influence of the number of samples of translation from the source language speech to the target language text on the training effect of the speech translation model is reduced, and the training method and the training effect of the speech translation model are optimized.

Figure 5:
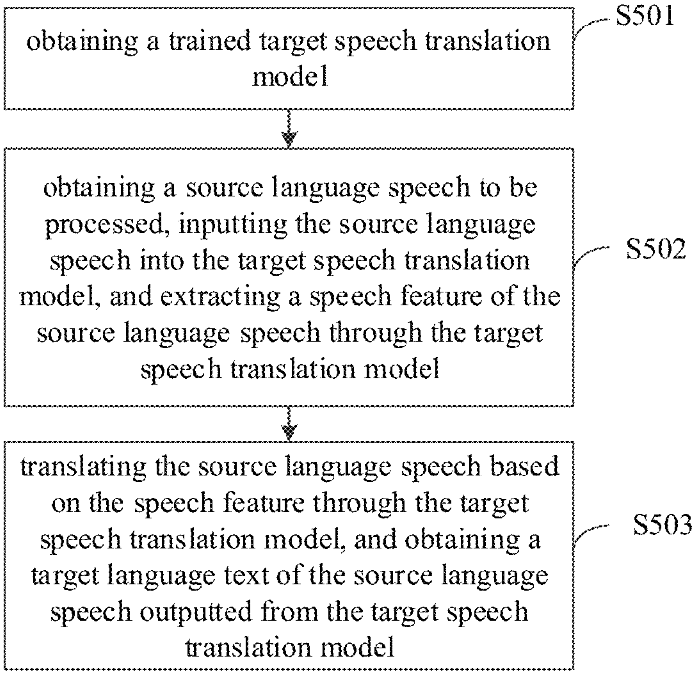
FIG. 5 is a flowchart of a method for speech translation according to an embodiment of the present disclosure.

A method for speech translation is also provided in the present disclosure, which may be understood in combination with FIG. 5. FIG. 5 is a flowchart illustrating a method for speech translation according to an embodiment of the present disclosure, and as shown in FIG. 5, the method including the following steps S501 to S503.

At S501, a trained target speech translation model is obtained.

In an embodiment of the present disclosure, the trained target speech translation model may be obtained based on the training method of the speech translation model for model training of the model to be trained.

The target speech translation model is obtained according to the training methods for speech translation model provided in the embodiments of FIG. 1 to FIG. 4.

At S502, a source language speech to be processed is obtained, and the source language speech is input into the target speech translation model, and a speech feature of the source language speech is extracted through the target speech translation model.

In an embodiment of the present disclosure, a language of a speech to be translated may be marked as the source language, and the speech to be translated may be marked as the source language speech.

Accordingly, a language of a text to which the source language speech is to be translated may be marked as the target language, and thus the text may be marked as the target language text for the source language speech.

As an example, a Chinese speech to be translated is required to be translated into an English text, then in example, Chinese is the source language, English is the target language, the Chinese speech is the source language speech, and the English text to be translated into is the target language text.

Alternatively, the source language speech may be input into the trained target speech translation model, and the feature of the source language speech may be extracted by a speech feature extraction layer in the target speech translation model, thus obtaining the speech feature in the source language speech.

At S503, the source language speech is translated based on the speech feature through the target speech translation model, and a target language text of the source language speech outputted from the target speech translation model is obtained.

In an embodiment of the present disclosure, the translation of the source language speech may be realized by performing corresponding feature processing on the extracted speech feature in the source language speech by the trained target speech translation model.

The extracted speech feature may be processed by a CNN layer, an encoder, and a decoder and other relevant model layers in the target speech translation model, thus obtaining a text output from the target speech translation model based on the processing result, and determining the text as the target language text of the source language speech.

The method for speech translation provided in the present disclosure, includes: obtaining the trained target speech translation model, extracting the speech feature of the source language speech through the target speech translation model, and translating the source language speech based on the extracted speech feature, thus obtaining the target language text of the source language speech outputted from the target speech translation model. In the present disclosure, the target speech translation model is obtained through the training method provided in the embodiments of FIG. 1 to FIG. 4, and the translation of the source language speech is achieved through the trained target speech translation model, which improves the achievability of the translation of the source language speech, reduces the difficulty of speech translation, improves the efficiency and accuracy of speech translation, and optimizes the speech translation method and effect.

For a better understanding of the above embodiments, the following table may be combined.

| | Language | | | | | | | |
|---|---|---|---|---|---|---|---|---|
| Method | de | es | fr | it | nl | pt | ro | ru |
| Fairseq ST | 22.7 | 27.2 | 32.9 | 22.7 | 27.3 | 28.1 | 21.9 | 15.3 |
| Dual Decoder | 23.6 | 28.1 | 33.5 | 24.2 | 27.6 | 30.0 | 22.9 | 15.2 |
| XSTNet | 25.5 | 29.6 | 36.0 | 25.5 | 30.0 | 31.3 | 25.1 | 16.9 |
| STEMM | 25.6 | 30.3 | 36.1 | 25.6 | 30.1 | 31.0 | 24.3 | 17.1 |
| target speech translation model | 27.9 | 32.1 | 29.0 | 27.7 | 32.4 | 34.0 | 26.3 | 19.0 |

In the above table, the translation method Fairseq ST, Dual Decoder, XSTNet and STEMM denote the translation methods in the related art, respectively, and de, es, fr, it, nl, pt, ro, and ru denote different kinds of language identifiers respectively, the number in the table may be configured to denote the translation effect parameter of the translation method in the corresponding language.

As shown in the above table, in a scenario of the translation method (Fairseq ST) being used for translation, the translation effect parameter for translating the source language speech into the target language text corresponding to the target language identified by de is 22.7, the translation effect parameter of the target language text corresponding to the target language identified by es is 27.2, and the translation effect parameter of the target language text corresponding to the target language identified by fr is 27.2, and so on.

In a scenario of performing the speech translation by using the target speech translation model obtained through the method for training the speech translation model provided in the embodiments of the present disclosure, the translation effect parameter for translating the source language speech into the target language text corresponding to the target language identified by de is 27.9, which is higher than the respective translation effect parameters of the target language text corresponding to the target language identified by de of the translation methods Fairseq ST, Dual Decoder, XSTNet and STEMM in the table.

In addition, the translation effect parameter for translating the source language speech, through the target speech translation model, into the target language text corresponding to the target language identified by es is 32.1, which is higher than the respective translation effect parameters of the target language text corresponding to the target language identified by es of the translation methods Fairseq ST, Dual Decoder, XSTNet and STEMM in the table.

Accordingly, the translation effect parameter for translating the source language speech, through the target speech translation model obtained through the method for training the speech translation model provided in the present disclosure, into the target language text corresponding to the target language identified by fr, it, nl, pt, ro and ru, respectively, is higher than the other translation methods listed in the table. In summary, the target speech translation model obtained through the method for training the speech translation model provided in the present disclosure, achieved the SOTA (State-Of-The-Art result) effect in the source language speech translation method in the above table.

Corresponding to the method for training the speech translation model provided in the above embodiments, embodiments of the present disclosure also provide an apparatus for training a speech translation model. Since the apparatus for training a speech translation model provided in the embodiments of the present disclosure corresponds to the training method with the intention degree prediction and model provided in the several embodiments described above, the implementation of the method for training the speech translation model described above is also applicable to the apparatus for training a speech translation model provided in the embodiments of the present disclosure, which will not be described in detail in the following embodiments.

Figure 6:
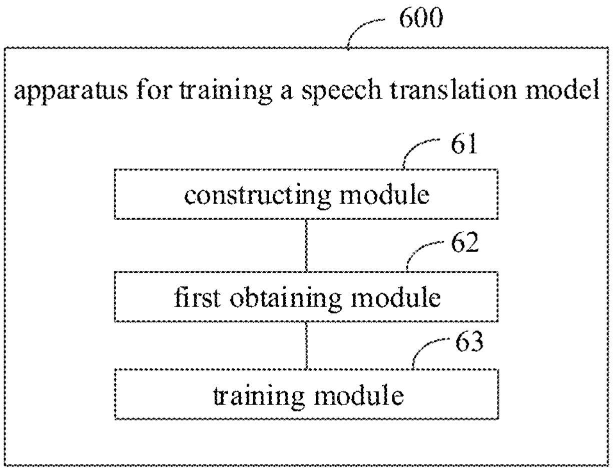
FIG. 6 is a diagram of an architecture of an apparatus for training a speech translation model according to an embodiment of the present disclosure.

FIG. 6 is a diagram illustrating an architecture of an apparatus for training a speech translation model according to an embodiment of the present disclosure. As shown in FIG. 6, the apparatus 600 for training a speech translation model, includes a constructing module 61, a first obtaining module 62, and a training module 63.

The constructing module 61 is configured to obtain a trained first text translation model and a speech recognition model, and construct a candidate speech translation model to be trained based on the first text translation model and the speech recognition model.

The first obtaining module 62 is configured to obtain a first sample source language speech and/or a first sample source language text to obtain a training sample of the candidate speech translation model.

The training module 63 is configured to train the candidate speech translation model based on the training sample until the training is completed and obtain a trained target speech translation model.

In an embodiment of the present disclosure, the constructing module 61, is further configured to: obtain a second text translation model to be trained, and a second sample source language text of a common field and a third sample source language text of a model applicable field; and train the second text translation model based on the second sample source language text to obtain a trained third text translation model; and perform model training on the third text translation model based on the third sample source language text to obtain the trained first text translation model; and link the speech recognition model with the first text translation model to obtain the candidate speech translation model to be trained.

In an embodiment of the present disclosure, the constructing module 61 is further configured to: input the second sample source language text into the second text translation model to obtain a first translated text outputted from the second text translation model; and obtain a first label text of the second sample source language text; and obtain a first training loss of the second text translation model based on the first translated text and the first label text; and adjust the second text translation model based on the first training loss, return to obtain a next second sample source language text and continue training the adjusted second text translation model until the completion of the training, and obtain the trained third text translation model.

In an embodiment of the present disclosure, the constructing module 61 is further configured to: input the third sample source language text into the third text translation model to obtain a second translated text outputted from the third text translation model; and obtain a second label text of the third sample source language text; and obtain a second training loss of the third text translation model based on the second translated text and the second label text; and adjust the third text translation model based on the second training loss, return to obtain the next third sample source language text and continue training the adjusted third text translation model until the completion of the training, and obtain the trained first text translation model.

In an embodiment of the present disclosure, the first obtaining module 62 is further configured to: obtain a first sample target language text of the first sample source language text and use the first sample target language text as a label for the first sample source language text to obtain the training sample of the candidate speech translation model; and/or, obtain a second sample target language text of the first sample source language speech and use the second sample target language text as a label for the first sample source language text to obtain the training sample of the candidate speech translation model; and/or, obtain a second sample source language text of the first sample source language speech and use the second sample source language text as a label for the first sample source language speech to obtain the training sample of the candidate speech translation model.

In an embodiment of the present disclosure, the training module 63 is further configured to: input the training sample into the candidate speech translation model to obtain a third translated text outputted from the candidate speech translation model; obtain a third label text of the training sample and obtain a third training loss of the third translated text based on the third label text; and adjust the candidate speech translation model based on the third training loss, and return to obtain a next training sample and continue training the adjusted candidate speech translation model until the completion of the training, and obtaining the trained target speech translation model.

The apparatus for training a speech translation model provided in the present disclosure is configured to obtain a trained first text translation model and a speech recognition model, and construct a candidate speech translation model to be trained based on the first text translation model and the speech recognition model; and obtain a first sample source language speech and/or a first sample source language text to obtain a training sample of the candidate speech translation model; and train the candidate speech translation model based on the training sample until the training is completed and obtain a trained target speech translation model. In the present disclosure, the candidate speech translation model to be trained is constructed through the trained text translation model and the speech recognition model, the difficulty of constructing the candidate speech translation model and the complexity of the model are reduced, and the realizability of the speech translation model is improved. Through training the text translation model separately and then training the speech translation model, the difficulty of training the speech translation model is reduced, and the influence of the number of samples from the source language speech to the target language text on the training effect of the speech translation model is reduced, and the training method and training effect for the speech translation model are optimized, the practicality and applicability of the speech translation model are improved. The efficiency and accuracy of speech translation are improved and the method for speech translation is optimized in the scenario of speech translation based on the trained target speech translation model.

Corresponding to the method for speech translation provided in the above embodiments, embodiments of the present disclosure also provide an apparatus for speech translation. Since the apparatus for speech translation provided in the embodiments of the present disclosure corresponds to the method for speech translation provided in the above embodiments, the implementation of the above method for speech translation is also applicable to the apparatus for speech translation provided in the embodiments of the present disclosure, which will not be described in detail in the following embodiments.

Figure 7:
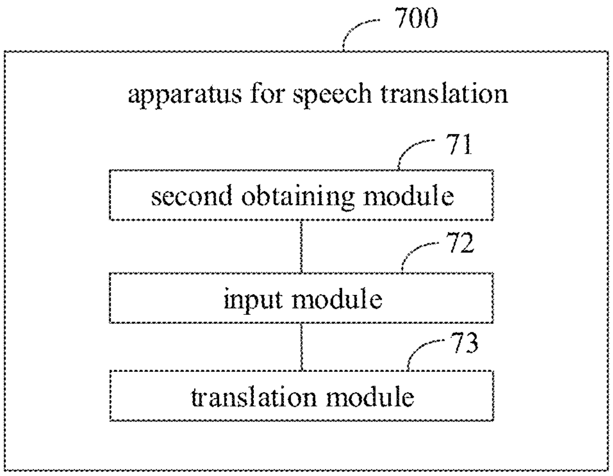
FIG. 7 is a diagram of an architecture of an apparatus for speech translation according to an embodiment of the present disclosure.

FIG. 7 is a diagram illustrating an architecture of an apparatus for speech translation according to an embodiment of the present disclosure. As shown in FIG. 7, the apparatus 700 for speech translation includes a second obtaining module 71, an input module 72, and a translation module 73.

The second obtaining module 71 is configured to obtain a trained target speech translation model, in which the target speech translation model is obtained from the apparatus for training a speech translation model of FIG. 6.

The input module 72 is configured to obtain a source language speech to be processed, and input the source language speech into the target speech translation model, and extract a speech feature of the source language speech through the target speech translation model.

The translation module 73 is configured to translate the source language speech based on the speech feature through the target speech translation model to obtain a target language text of the source language speech outputted from the target speech translation model.

The apparatus for speech translation provided in the present disclosure is configured to obtain a trained target speech translation model, and extract a speech feature of the source language speech through the target speech translation model, and translate the source language speech based on the extracted speech feature, thus obtaining the target language text of the source language speech outputted from the target speech translation model. In the present disclosure, the target speech translation model is obtained through the training method provided in the embodiments of FIG. 1 to FIG. 4, and the translation of the source language speech is achieved through the trained target speech translation model, which improves the achievability of the translation of the source language speech, reduces the difficulty of speech translation, improves the efficiency and accuracy of speech translation, and optimizes the speech translation method and effect.

According to embodiments of the present disclosure, there are also provided an electronic device, a readable storage medium, and a computer program product.

Figure 8:
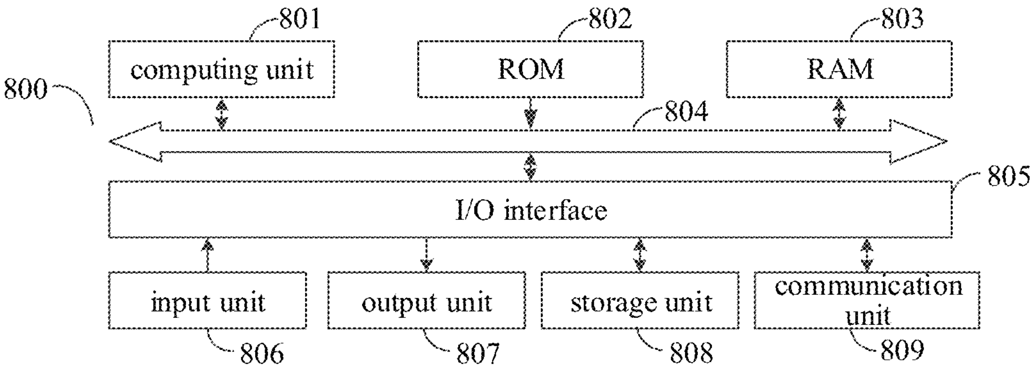
FIG. 8 is a block diagram of an electronic device according to an embodiment of the present disclosure.

Referring to FIG. 8, which is a block diagram illustrating an electronic device 800 according to an embodiment of the present disclosure. The electronic device is intended to represent various types of digital computers, such as laptop computers, desktop computers, workstations, personal digital assistants, servers, blade servers, mainframe computers, and other suitable computers. The electronic device may also represent various types of mobile apparatuses, such as personal digital assistants, cellular phones, smart phones, wearable non-intrusive flexible loads aggregation characteristic identification devices, and other similar computing devices. The components shown herein, their connections and relations, and their functions are merely examples, and are not intended to limit the implementation of the disclosure described and/or required herein.

As shown in FIG. 8, the device 800 includes a computing unit 801, configured to execute various appropriate actions and processes according to a computer program stored in a read-only memory (ROM) 802 or loaded from a storage unit 809 to a random access memory (RAM) 803. In the RAM 803, various programs and data required for the device 800 may be stored. The computing unit 801, the ROM 802 and the RAM 803 may be connected with each other by a bus 804. An input/output (I/O) interface 805 is also connected to the bus 804.

The device 800 are connected to an I/O interface 805, and includes: an input unit 806, for example, a keyboard, a mouse; an output unit 807, for example, various types of displays, speakers; a storage unit 808, for example, a magnetic disk, an optical disk; and a communication unit 809, for example, a network card, a modem, a wireless transceiver. The communication unit 809 allows the device 800 to exchange information/data through a computer network such as internet and/or various types of telecommunication networks and other devices.

The computing unit 801 may be various types of general and/or dedicated processing components with processing and computing ability. Some examples of a computing unit 801 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. The computing unit 801 executes various methods and processes as described above, for example, a method for training a speech translation model and/or a method for speech translation. For example, in some embodiments, the method for training a speech translation model and/or the method for speech translation may be further implemented as a computer software program, which is physically contained in a machine readable medium, such as the storage unit 808. In some embodiments, a part or all of the computer program may be loaded and/or installed on the device 800 via the ROM 802 and/or a communication unit 809. When the computer program is loaded on the RAM 803 and executed by the computing unit 801, one or more steps in the method for protein docking as described above may be performed. Alternatively, in other embodiments, the computing unit 801 may be configured to the method for training a speech translation model and/or the method for speech translation in other appropriate ways (for example, by virtue of a firmware).

Various implementation modes of systems and technologies described herein may be implemented in a digital electronic circuit system, an integrated circuit system, a field programmable gate array (FPGA), a dedicated application specific integrated circuit (ASIC), a system on a chip (SOC), a complex programmable logic device (CPLD), a computer hardware, a firmware, a software, and/or combinations thereof. The implementations may include: implemented in one or more computer programs. The one or more computer programs may be executed and/or interpreted on a programmable system including at least one programmable processor. The programmable processor may be a dedicated or general-purpose programmable processor, may receive data and instructions from a storage system, at least one input device, and at least one output device, and transmit the data and the instructions to the storage system, the at least one input device, and the at least one output device.

A computer code configured to execute a method in the present disclosure may be written with one or any combination of multiple programming languages. These programming languages may be provided to a processor or a controller of a general-purpose computer, a dedicated computer, or other programmable apparatuses for data processing so that the function/operation specified in the flowchart and/or block diagram may be performed when the program code is executed by the processor or controller. A computer code may be executed completely or partly on the machine, executed partly on the machine as an independent software package and executed partly or completely on the remote machine or server.

In the embodiment of the present disclosure, a machine-readable medium may be a tangible medium that may contain or store a program intended for use in or in conjunction with an instruction execution system, an apparatus or a device. The machine-readable medium may be a machine-readable signal medium or a machine-readable storage medium. The machine-readable medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an EPROM programmable read-only ROM (an EPROM or a flash memory), an optical fiber device, and a compact disc read-only memory (CD-ROM), an optical storage device, a magnetic storage device, or any appropriate combination of the above.

In order to provide interaction with the user, the systems and technologies described here may be implemented on a computer, and the computer has: a display apparatus for displaying information to the user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a voice input or a tactile input).

Systems and technologies described herein may be implemented in a computing system (for example, as a data server) including a background component, or a computing system (for example, an application server) including a middleware component, or a computing system including a front-end component (for example, a user computer with a graphical user interface or a web browser, and the user may interact with implementations of the systems and technologies described herein via the graphical user interface or the web browser), or in a computing system including any combination of the background component, the middleware component, or the front-end component. Components of the system may be interconnected by any form or medium of digital data communication (for example, a communication network). Examples of the communication network include a local area network (LAN), a wide area network (WAN), and an Internet.

The computer system may include a client and a server. The client and the server are generally far away from each other and generally interact with each other through a communication network. The relationship between the client and the server is generated by computer programs that run on the corresponding computer and have a client-server relationship with each other. A server may be a cloud server, or a server with a distributed system, or a server in combination with a blockchain.

It should be noted that various forms of processes shown above may be used to reorder, add, or delete steps. For example, steps described in the present disclosure may be executed in parallel, sequentially, or in a different order, as long as the desired result of the technical solution disclosed in the present disclosure may be achieved, which will not be limited herein.

The above implementations do not constitute a limitation of the protection scope of the disclosure. Those skilled in the art shall understand that various modifications, combinations and sub-combinations and substitutions may be made. Any modification, equivalent substitution and improvement, etc., made within the spirit and principle of the present disclosure shall be included within the protection scope of the present disclosure.

What is claimed is:

1. A method for training a speech translation model, comprising:

obtaining a trained first text translation model and a speech recognition model, and constructing a candidate speech translation model to be trained based on the first text translation model and the speech recognition model;

obtaining at least one of a first sample source language speech or a first sample source language text to obtain a training sample of the candidate speech translation model; and training the candidate speech translation model based on the training sample until the training is completed, and obtaining a trained target speech translation model, wherein obtaining at least one of the first sample source language speech or the first sample source language text to obtain the training sample of the candidate speech translation model, comprises:

obtaining a first sample target language text of the first sample source language text and using the first sample target language text as a label for the first sample source language text to obtain a training sample related to a text translation capability dimension of the candidate speech translation model;

obtaining a second sample target language text of the first sample source language speech and using the second sample target language text as a label for the first sample source language text to obtain a training sample related to a speech translation capability dimension of the candidate speech translation model; and obtaining a second sample source language text of the first sample source language speech and using the second sample source language text as a label for the first sample source language speech to obtain a training sample related to a speech feature extraction capability dimension of the candidate speech translation model.

2. The method according to claim 1, wherein obtaining the trained first text translation model and the speech recognition model, and constructing the candidate speech translation model to be trained based on the first text translation model and the speech recognition model, comprises:

obtaining a second text translation model to be trained, and a second sample source language text of a common field and a third sample source language text of a model applicable field;

training the second text translation model based on the second sample source language text to obtain a trained third text translation model;

performing model training on the third text translation model based on the third sample source language text to obtain the trained first text translation model; and linking the speech recognition model with the first text translation model to obtain the candidate speech translation model to be trained.

3. The method according to claim 2, wherein training the second text translation model based on the second sample source language text to obtain the trained third text translation model, comprises:

inputting the second sample source language text into the second text translation model to obtain a first translated text outputted from the second text translation model;

obtaining a first label text of the second sample source language text;

obtaining a first training loss of the second text translation model based on the first translated text and the first label text; and adjusting the second text translation model based on the first training loss, returning to obtain a next second sample source language text and continuing training the adjusted second text translation model until the completion of the training, and obtaining the trained third text translation model.

4. The method according to claim 2, wherein performing model training on the third text translation model based on the third sample source language text to obtain the trained first text translation model, comprises:

inputting the third sample source language text into the third text translation model to obtain a second translated text outputted from the third text translation model;

obtaining a second label text of the third sample source language text;

obtaining a second training loss of the third text translation model based on the second translated text and the second label text; and adjusting the third text translation model based on the second training loss, returning to obtain a next third sample source language text and continuing training the adjusted third text translation model until the completion of the training, and obtaining the trained first text translation model.

5. The method according to claim 1, wherein training the candidate speech translation model based on the training samples until the training is completed and obtaining the trained target speech translation model, comprises:

inputting the training sample into the candidate speech translation model to obtain a third translated text outputted from the candidate speech translation model;

obtaining a third label text of the training sample and obtaining a third training loss of the third translated text based on the third label text; and adjusting the candidate speech translation model based on the third training loss, returning to obtain a next training sample and continuing training the adjusted candidate speech translation model until the completion of the training, and obtaining the trained target speech translation model.

6. The method according to claim 1, wherein the trained target speech translation model is configured to perform a method for speech translation, the method comprising:

obtaining a source language speech to be processed, inputting the source language speech into the target speech translation model, and extracting a speech feature of the source language speech through the target speech translation model; and translating the source language speech based on the speech feature through the target speech translation model, and obtaining a target language text of the source language speech outputted from the target speech translation model.

7. An electronic device, comprising:

at least one processor; and a memory communicatively coupled to the at least one processor and storing instructions executable by the at least one processor;

wherein the at least one processor is configured to:

obtain a trained first text translation model and a speech recognition model, and construct a candidate speech translation model to be trained based on the first text translation model and the speech recognition model;

obtain at least one of a first sample source language speech or a first sample source language text to obtain a training sample of the candidate speech translation model; and train the candidate speech translation model based on the training sample until the training is completed and obtain a trained target speech translation model, wherein the at least one processor, in obtaining at least one of the first sample source language speech or the first sample source language text to obtain the training sample of the candidate speech translation model, is further configured to:

obtain a first sample target language text of the first sample source language text and use the first sample target language text as a label for the first sample source language text to obtain a training sample related to a text translation capability dimension of the candidate speech translation model;

obtain a second sample target language text of the first sample source language speech and use the second sample target language text as a label for the first sample source language text to obtain a training sample related to a speech translation capability dimension of the candidate speech translation model; and obtain a second sample source language text of the first sample source language speech and use the second sample source language text as a label for the first sample source language speech to obtain a training sample related to a speech feature extraction capability dimension of the candidate speech translation model.

8. The device according to claim 7, wherein the at least one processor is further configured to:

obtain a second text translation model to be trained, and a second sample source language text of a common field and a third sample source language text of a model applicable field;

train the second text translation model based on the second sample source language text to obtain a trained third text translation model;

perform model training on the third text translation model based on the third sample source language text to obtain the trained first text translation model; and link the speech recognition model with the first text translation model to obtain the candidate speech translation model to be trained.

9. The device according to claim 8, wherein the at least one processor is further configured to:

input the second sample source language text into the second text translation model to obtain a first translated text outputted from the second text translation model;

obtain a first label text of the second sample source language text;

obtain a first training loss of the second text translation model based on the first translated text and the first label text; and adjust the second text translation model based on the first training loss, return to obtain a next second sample source language text and continue training the adjusted second text translation model until the completion of the training, and obtain the trained third text translation model.

10. The device according to claim 8, wherein the at least one processor is further configured to:

input the third sample source language text into the third text translation model to obtain a second translated text outputted from the third text translation model;

obtain a second label text of the third sample source language text;

obtain a second training loss of the third text translation model based on the second translated text and the second label text; and adjust the third text translation model based on the second training loss, return to obtain the next third sample source language text and continue training the adjusted third text translation model until the completion of the training, and obtain the trained first text translation model.

11. The device according to claim 7, wherein the at least one processor is further configured to:

input the training sample into the candidate speech translation model to obtain a third translated text outputted from the candidate speech translation model;

obtain a third label text of the training sample and obtain a third training loss of the third translated text based on the third label text; and adjust the candidate speech translation model based on the third training loss, and return to obtain a next training sample and continue training the adjusted candidate speech translation model until the completion of the training, and obtaining the trained target speech translation model.

12. The device according to claim 7, wherein the trained target speech translation model is configured to perform a method for speech translation, the method comprising:

obtaining a source language speech to be processed, inputting the source language speech into the target speech translation model, and extracting a speech feature of the source language speech through the target speech translation model; and translating the source language speech based on the speech feature through the target speech translation model, and obtaining a target language text of the source language speech outputted from the target speech translation model.

13. A non-transitory computer-readable storage medium storing computer instructions that, when being executed a processor of a computer, cause the computer to perform a method for training a speech translation model, comprising:

obtaining a trained first text translation model and a speech recognition model, and constructing a candidate speech translation model to be trained based on the first text translation model and the speech recognition model;

obtaining at least one of a first sample source language speech or a first sample source language text to obtain a training sample of the candidate speech translation model; and training the candidate speech translation model based on the training sample until the training is completed, and obtaining a trained target speech translation model, wherein obtaining at least one of the first sample source language speech or the first sample source language text to obtain the training sample of the candidate speech translation model, comprises:

obtaining a first sample target language text of the first sample source language text and using the first sample target language text as a label for the first sample source language text to obtain a training sample related to a text translation capability dimension of the candidate speech translation model;

obtaining a second sample target language text of the first sample source language speech and using the second sample target language text as a label for the first sample source language text to obtain a training sample related to a speech translation capability dimension of the candidate speech translation model; and obtaining a second sample source language text of the first sample source language speech and using the second sample source language text as a label for the first sample source language speech to obtain a training sample related to a speech feature extraction capability dimension of the candidate speech translation model.

14. The storage medium according to claim 13, wherein obtaining the trained first text translation model and the speech recognition model, and constructing the candidate speech translation model to be trained based on the first text translation model and the speech recognition model, comprises:

obtaining a second text translation model to be trained, and a second sample source language text of a common field and a third sample source language text of a model applicable field;

training the second text translation model based on the second sample source language text to obtain a trained third text translation model;

performing model training on the third text translation model based on the third sample source language text to obtain the trained first text translation model; and linking the speech recognition model with the first text translation model to obtain the candidate speech translation model to be trained.

15. The storage medium according to claim 14, wherein training the second text translation model based on the second sample source language text to obtain the trained third text translation model, comprises:

inputting the second sample source language text into the second text translation model to obtain a first translated text outputted from the second text translation model;

obtaining a first label text of the second sample source language text;

obtaining a first training loss of the second text translation model based on the first translated text and the first label text; and adjusting the second text translation model based on the first training loss, returning to obtain a next second sample source language text and continuing training the adjusted second text translation model until the completion of the training, and obtaining the trained third text translation model.

16. The storage medium according to claim 14, wherein performing model training on the third text translation model based on the third sample source language text to obtain the trained first text translation model, comprises:

inputting the third sample source language text into the third text translation model to obtain a second translated text outputted from the third text translation model;

obtaining a second label text of the third sample source language text;

obtaining a second training loss of the third text translation model based on the second translated text and the second label text; and adjusting the third text translation model based on the second training loss, returning to obtain a next third sample source language text and continuing training the adjusted third text translation model until the completion of the training, and obtaining the trained first text translation model.

17. The storage medium according to claim 13, wherein training the candidate speech translation model based on the training samples until the training is completed and obtaining the trained target speech translation model, comprises:

inputting the training sample into the candidate speech translation model to obtain a third translated text outputted from the candidate speech translation model;

obtaining a third label text of the training sample and obtaining a third training loss of the third translated text based on the third label text; and adjusting the candidate speech translation model based on the third training loss, returning to obtain a next training sample and continuing training the adjusted candidate speech translation model until the completion of the training, and obtaining the trained target speech translation model.

18. The storage medium according to claim 13, wherein the trained target speech translation model is configured to perform a method for speech translation, the method comprising:

obtaining a source language speech to be processed, inputting the source language speech into the target speech translation model, and extracting a speech feature of the source language speech through the target speech translation model; and translating the source language speech based on the speech feature through the target speech translation model, and obtaining a target language text of the source language speech outputted from the target speech translation model.

* * * * *